(12) United States Patent
Blömker et al.

(10) Patent No.: US 10,858,209 B2
(45) Date of Patent: Dec. 8, 2020

(54) ADHESIVE TAPE AND ITS USE

(71) Applicant: TESA SE, Norderstedt (DE)

(72) Inventors: Tobias Blömker, Hamburg (DE); Niels Czerwonatis, Hamburg (DE); Kerstin Götz, Hamburg (DE); Julia Schwarzbach, Hamburg (DE)

(73) Assignee: TESA SE, Norderstedt (DE)

( * ) Notice: Subject to any disclaimer, the term of this patent is extended or adjusted under 35 U.S.C. 154(b) by 29 days.

(21) Appl. No.: 15/349,446

(22) Filed: Nov. 11, 2016

(65) Prior Publication Data

US 2017/0137246 A1    May 18, 2017

(30) Foreign Application Priority Data

Nov. 12, 2015    (DE) .................. 10 2015 222 282

(51) Int. Cl.
  *B65H 19/10*    (2006.01)
  *B65H 19/18*    (2006.01)
  (Continued)

(52) U.S. Cl.
  CPC ....... *B65H 19/102* (2013.01); *B65H 19/1826* (2013.01); *C09J 7/20* (2018.01); *C09J 7/21* (2018.01); *C09J 7/38* (2018.01); *C09J 7/383* (2018.01); *B65H 19/181* (2013.01); *B65H 2301/4607* (2013.01); *B65H 2301/4621* (2013.01); *B65H 2301/46312* (2013.01); *C09J 107/00* (2013.01); *C09J 2201/128* (2013.01);
  (Continued)

(58) Field of Classification Search
  None
  See application file for complete search history.

(56) References Cited

U.S. PATENT DOCUMENTS 2,366,219 A * 1/1945 Soday ..................... C08L 21/00
                                                          442/151
3,242,110 A * 3/1966 Korpman ............... C09J 121/00
                                                          525/155
(Continued)

FOREIGN PATENT DOCUMENTS

DE        196 32 689 A1    2/1998
DE        198 06 609 A1    8/1999
(Continued)

OTHER PUBLICATIONS

"Handbook of Pressure Sensitive Adhesive Technology" by Donatas Satas (van Nostrand, 1989).
(Continued)

*Primary Examiner* — Mark A Osele
(74) *Attorney, Agent, or Firm* — Norris McLaughlin, P.A.

(57) ABSTRACT

Adhesive tape for flying splices of flat web materials, in particular flat web materials with nonpolar surfaces, said adhesive tape at least comprising an upper self-adhesive compound layer, an inner adhesive tape area adapted as a flat predetermined breaking point, and a lower self-adhesive compound on the underside of the inner adhesive tape area, wherein a natural rubber adhesive compound is used as the self-adhesive compound for at least the upper self-adhesive compound layer, as well as methods for flying splices of flat web material wound onto rolls, in particular with nonpolar surfaces, using a corresponding adhesive tape.

14 Claims, 2 Drawing Sheets

(51) Int. Cl.
*C09J 7/02* (2006.01)
*C09J 7/21* (2018.01)
*C09J 7/20* (2018.01)
*C09J 7/38* (2018.01)
*C09J 107/00* (2006.01)

(52) U.S. Cl.
CPC .... *C09J 2203/342* (2013.01); *C09J 2205/102* (2013.01); *C09J 2407/00* (2013.01)

(56) References Cited

U.S. PATENT DOCUMENTS

| | | | |
|---|---|---|---|
| 3,554,940 A * | 1/1971 | Arakawa et al. | C08F 8/04 524/187 |
| 4,335,026 A * | 6/1982 | Balinth | C09J 121/00 524/271 |
| 5,901,919 A | 5/1999 | Wienberg | |
| 5,916,651 A | 6/1999 | Wienberg et al. | |
| 5,950,531 A | 9/1999 | Uchiyama | |
| 6,416,604 B1 | 7/2002 | Nootbaar et al. | |
| 6,595,461 B1 | 7/2003 | Storbeck et al. | |
| 6,627,023 B1 | 9/2003 | Gleichenhagen et al. | |
| 6,637,697 B1 | 10/2003 | Wienberg | |
| 6,780,271 B1 | 8/2004 | Burmeister et al. | |
| 6,817,567 B2 | 11/2004 | Storbeck et al. | |
| 7,086,627 B2 | 8/2006 | Kehler et al. | |
| 7,087,278 B2 | 8/2006 | Eikmeier et al. | |
| 7,108,220 B2 | 9/2006 | Nagel et al. | |
| 7,152,825 B2 | 12/2006 | Nootbaar | |
| 7,240,873 B2 | 7/2007 | Eikmeier et al. | |
| 7,264,194 B2 | 9/2007 | Gassner et al. | |
| 8,268,442 B2 | 9/2012 | Ellringmann et al. | |
| 8,287,973 B2 | 10/2012 | Natel et al. | |
| 8,343,605 B2 | 1/2013 | Götz et al. | |
| 8,354,152 B2 | 1/2013 | Götz et al. | |
| 8,545,653 B2 | 10/2013 | Nagel et al. | |
| 8,597,751 B2 | 12/2013 | Gotz et al. | |
| 8,840,515 B2 | 9/2014 | van Der Hardt Aberson et al. | |
| 8,993,082 B2 | 3/2015 | Gotz et al. | |
| 9,034,451 B2 | 5/2015 | Nagel et al. | |
| 2001/0003617 A1 | 6/2001 | Storbeck et al. | |
| 2002/0172790 A1 | 11/2002 | Nagel et al. | |
| 2003/0190445 A1 | 10/2003 | Nootbaar | |
| 2004/0115403 A1 | 6/2004 | Eikmeier et al. | |
| 2004/0115427 A1 | 6/2004 | Kehler et al. | |
| 2004/0219355 A1 * | 11/2004 | Clemmens | C09J 7/38 428/343 |
| 2004/0256514 A1 | 12/2004 | Eikmeier et al. | |
| 2004/0256517 A1 | 12/2004 | Gassner et al. | |
| 2005/0006520 A1 | 1/2005 | Gassner et al. | |
| 2005/0103429 A1 | 5/2005 | Eikmeier et al. | |
| 2005/0142370 A1 | 6/2005 | Mussig | |
| 2006/0073301 A1 | 4/2006 | Nagel et al. | |
| 2007/0128432 A1 | 6/2007 | Eikmeier et al. | |
| 2007/0154706 A1 | 7/2007 | Mussig | |
| 2007/0175569 A1 | 8/2007 | Eikmeier et al. | |
| 2007/0251633 A1 | 11/2007 | Nagel et al. | |
| 2008/0081186 A1 | 4/2008 | Ellringmann et al. | |
| 2008/0087370 A1 * | 4/2008 | Manteufel | C09J 7/29 156/157 |
| 2008/0286533 A1 | 11/2008 | Götz et al. | |
| 2009/0092779 A1 | 4/2009 | Nagel et al. | |
| 2009/0266475 A1 | 10/2009 | Wulf et al. | |
| 2009/0280323 A1 | 11/2009 | Harder et al. | |
| 2009/0294029 A1 | 12/2009 | Götz et al. | |
| 2009/0294030 A1 | 12/2009 | Nagel et al. | |
| 2009/0294054 A1 | 12/2009 | Götz et al. | |
| 2009/0297833 A1 | 12/2009 | Nagel et al. | |
| 2011/0083802 A1 | 4/2011 | Nagel et al. | |
| 2012/0289373 A1 | 11/2012 | van Der Hardt Aberson et al. | |
| 2013/0112341 A1 | 5/2013 | Nagel et al. | |
| 2014/0079918 A1 | 3/2014 | Götz et al. | |
| 2015/0284599 A1 | 10/2015 | Kerep et al. | |
| 2017/0029666 A1 | 2/2017 | Kerep et al. | |
| 2018/0086945 A1 * | 3/2018 | Harada | C09J 7/245 |

FOREIGN PATENT DOCUMENTS

| | | |
|---|---|---|
| DE | 198 41 609 A1 | 3/2000 |
| DE | 199 02 179 A1 | 8/2000 |
| EP | 0 818 408 A1 | 1/1998 |
| EP | 0 860 489 A2 | 8/1998 |
| EP | 0 881 046 A2 | 12/1998 |
| EP | 0 970 904 A1 | 1/2000 |
| EP | 0 970 905 A1 | 1/2000 |
| EP | 1 022 245 A2 | 7/2000 |
| EP | 1 076 026 A2 | 2/2001 |
| EP | 1 104 795 A2 | 6/2001 |
| EP | 1 215 287 A2 | 12/2001 |
| EP | 1 258 441 A2 | 11/2002 |
| EP | 1 342 684 A2 | 9/2003 |
| EP | 1 428 861 A2 | 6/2004 |
| EP | 1 604 927 A1 | 12/2005 |
| EP | 1 645 533 A1 | 4/2006 |
| EP | 1 355 843 B1 | 5/2006 |
| EP | 2 048 212 A1 | 4/2009 |
| EP | 2 113 543 A1 | 11/2009 |
| EP | 2 116 581 A1 | 11/2009 |
| EP | 2 130 886 A2 | 12/2009 |
| EP | 2 130 887 A2 | 12/2009 |
| EP | 2 130 888 A2 | 12/2009 |
| EP | 2 130 889 A2 | 12/2009 |
| EP | 1 948 545 B1 | 3/2012 |
| EP | 2 615 049 A1 | 7/2013 |
| EP | 2 571 949 B1 | 3/2015 |
| WO | 94/11175 A1 | 5/1994 |
| WO | 95/25774 A1 | 9/1995 |
| WO | 95/29115 A1 | 11/1995 |
| WO | 97/07963 A1 | 3/1997 |
| WO | 99/46196 A1 | 9/1999 |
| WO | 03/006567 A1 | 1/2003 |
| WO | 03/018451 A1 | 3/2003 |
| WO | 03/018453 A1 | 3/2003 |
| WO | 03/018454 A1 | 3/2003 |
| WO | 03/024850 A1 | 3/2003 |
| WO | 2007/048695 A1 | 5/2007 |
| WO | 2007/096010 A1 | 8/2007 |
| WO | 2011/069821 A1 | 6/2011 |
| WO | 2011/144466 A2 | 11/2011 |
| WO | 2015/149889 A1 | 10/2015 |

OTHER PUBLICATIONS

Skelhorne, Electron Beam Processing, in Chemistry and Technology of UV and EB formulation for Coatings, Inks and Paints, vol. 1, 1991, SITA, London.

European Search Report from corresponding application dated May 2, 2017.

* cited by examiner

ADHESIVE TAPE AND ITS USE

This application claims priority of German Patent Application No. 10 2015 222 282.9, filed Nov. 12, 2015, the entire contents of which are incorporated herein by reference.

The invention concerns an adhesive tape for flying splices of nonpolar flat web material that is wound upon rolls according to the characteristics of the generic portion of the main claim, as well as a method for flying splices of nonpolar flat web material that is wound upon rolls.

In the processing of flat web material (paper, films, nonwoven materials, and the like), the flying splice is a common method for replacing an old, almost depleted roll with a new roll without having to stop the machines operating at high speeds. In such flying splices, self-adhesive tapes (also referred to as pressure-sensitive adhesive tapes) are often used in order to bond the end of the old web to the beginning of the new web.

A flying splice (also referred to as a "dynamic splice") is carried out in the film and nonwoven material processing industry in materials with nonpolar surfaces according to two different methods.

In the first method, double-sided self-adhesive tapes are manually bonded at the beginning of the web of the new roll in an advantageous configuration (ordinarily w- or v-shaped), and the web material protruding beyond the adhesive tape is cut off. In addition, the beginning of the web of the new roll is attached using so-called fixing labels (or "fixes") on the underlying coil of the new roll in order to prevent the web from being unwound when the new roll accelerates to the surface speed of the old roll. A drawback of this method is that preparation of the rolls is highly time-consuming, and bonding must be carried out by specialized personnel. Moreover, this method does not always produce the desired results, as bonds produced in this manner are relatively thick because of the layering of web material, fixing labels, and adhesive strips. Moreover, in the case of thin, flexible web materials in particular, it may happen that bulges occur at the beginning of a new web because of the opposing air stream generated by rotation, which generally can cause poor bonding of the webs.

In the second known method, a single sided self-adhesive tape is bonded overlapping and in a straight line under the free end of the first web of the new roll, so that the bonding side faces outward and is only partly covered by the new web. The exposed part of the bonding side facing outward is bonded to the web of the old roll. In this method, in order to prevent unwinding of the web on acceleration of the new roll to the surface speed of the old roll, a liquid is inserted between the first coil of the new roll and the underlying coil so that the upper coil is fixed by capillary forces on the underlying coil. A drawback in this case is that in this method as well, specialized personnel are required, and the method does not always produce technically advantageous results, as the efficiency of fixation of the web materials by a liquid depends on numerous parameters, for example the surface energy, flexibility and weight per unit area of the film material, the amount of liquid used, its polarity, viscosity, and density, as well as the layer thickness, area, and shear behaviour of the liquid film. In addition, a corresponding drawback of this method is that the web speed during the splice must not be too great, and the liquid used also causes contamination of the facility and the web material.

The above method is also used in the paper processing industry. Here, an improvement in the first process of the splice method (splicing method; splicing process) is that the fix used for fixation in the self-adhesive tape bonding the paper webs is configured in an integrated manner. After bonding of the webs, the splittable backing serving as a fix splits, so that a part of the splittable backing remains on the self-adhesive tape bonding the webs (i.e. on the upper coil), while the other part remains on the underlying coil. Backings are referred to as "splittable" if they can be split parallel to their surface, particularly those that actually split as required in the splice.

A number of products are known in the paper processing industry for carrying out this method. For example, DE 196 32 689 A2 discloses an adhesive tape that is equipped with a splittable paper backing in addition to the main backing. Due to the dynamic stresses occurring on bonding of the webs of the two rolls, the paper backing splits off, and with its residues, non-adhesively covers the adhesive compound used for fixation over an area that is exposed in the case of other adhesive tapes. DE 199 02 179 A1 also discloses such an adhesive tape, in which the splittable paper backing is arranged offset to the main backing in order to prevent tearing under stress.

In order to improve flying splices in the film and web processing industry, it would be advantageous to be able to use adhesive tapes structured similarly to those already known from the paper processing industry. This is particularly desirable for films and nonwoven materials with nonpolar surfaces. Such nonpolar surfaces occur in materials with a low surface energy, for example polyethylene, polypropylene, or polyethylene terephthalate (PET).

For such nonpolar surfaces, self-adhesive compounds are required that are particularly high in adhesiveness and tack. The high adhesive strength and high initial tack (so-called "tackiness") required for this purpose can ordinarily be obtained by increasing the flowability of the adhesive compound.

It can also be seen in the paper manufacturing and processing industry that papers are increasingly nonpolar because of the added additives and/or surface treatments, such as certain glues, starch application, and the like. The result is that in this case as well, it is becoming increasingly important to adapt adhesive compounds correspondingly.

In a splicing method, however, conventional highly adhesive and highly tacky adhesive compounds are poorly suited or completely unsuitable for flying splices with nonpolar materials such as films, nonwoven materials, and certain papers. The increase in the adhesive strength and initial tack of an adhesive compound is accompanied by an increase in its flowability. Because of this high flowability, such an adhesive compound is pressed out laterally from the adhesive splittable system and can even penetrate into the splittable backing, which can result in overall blocking of the splittable system and failure of the splice bond. A further drawback is that the flowable adhesive compounds escape from the adhesive joints during the splicing process, which can cause residues to remain uncovered in the system after splitting of the splittable backing adhesive compound.

An improvement in splicing adhesive tapes for film materials is provided by adhesive tapes such as those presented in DE 10 2006 008 561 A. Here, adhesive compounds are used for the upper adhesive compound layer, i.e. the layer that adheres to the unwinding film web in the splicing process, including adhesive compounds based on synthetic rubber with a styrene-isoprene-styrene block copolymer base. Suitable synthetic rubber compounds adhere to substrates with nonpolar surfaces better than acrylate-based adhesive compounds. However, at higher temperatures—such as temperatures above 100° C.—the styrene domains of the block copolymers melt, so such adhesive compounds cannot be used at higher temperatures.

The object of the invention was therefore to provide an adhesive tape with at least one upper adhesive compound, in particular a self-adhesive compound, a splittable backing, and a lower self-adhesive compound on the underside of the splittable backing, which is also particularly suitable, even at increased temperatures, for flying splices at high web velocities of nonpolar flat web material that is wound upon rolls.

It was possible to outstandingly achieve the object of the invention by means of an adhesive tape for flying splices of flat web materials, in particular flat web materials with nonpolar surfaces, comprising at least one upper adhesive compound layer, in particular a self-adhesive compound layer, an inner adhesive tape area adapted as a flat predetermined breaking point—also referred to in the following as a predetermined breaking area—and a lower adhesive compound layer, in particular a self-adhesive compound, on the underside of the inner adhesive tape area, wherein a natural rubber adhesive compound is used as the adhesive compound (in particular as the self-adhesive compound) for at least the upper adhesive compound layer (in particular the self-adhesive compound layer), i.e., the adhesive compound layer (in particular the self-adhesive compound layer) that bonds to the unwinding web in the splicing process.

BRIEF DESCRIPTION OF THE DRAWINGS

The invention will now be described in greater detail with reference to the drawings wherein.

Figure 1:
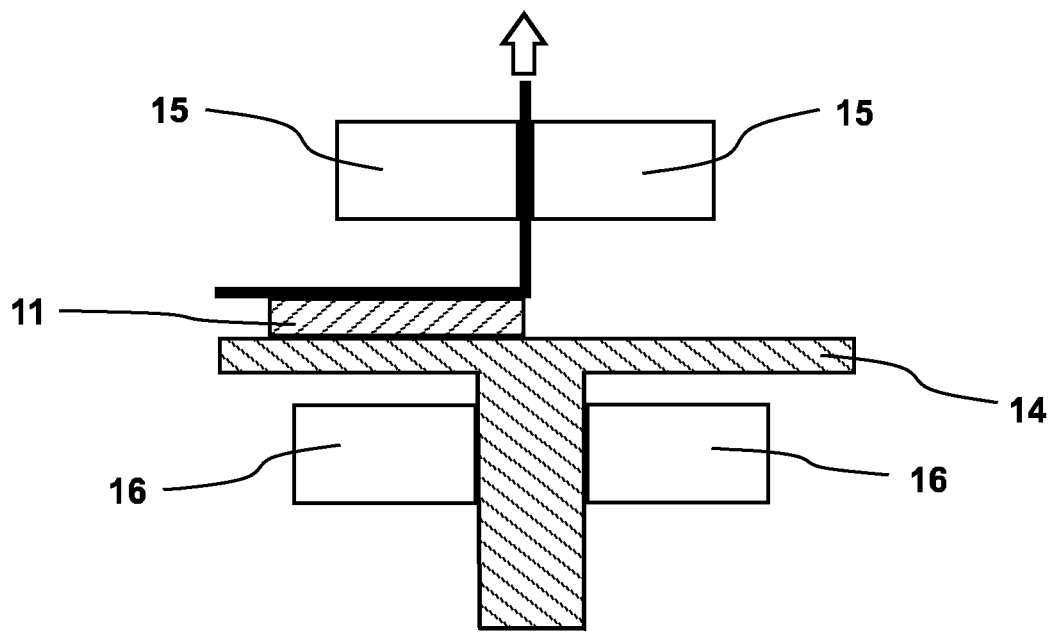
FIG. 1 schematically depicts the measurement of the splitting force.

Nonpolar surfaces occur in materials with a low surface energy, such as polyethylene (PE), polypropylene (PP), or polyethylene terephthalate (PET). Surface energy is considered to be low if it is 50 mN/m or less, and preferably less than 40 mN/m. When reference is made in this application to materials with nonpolar surfaces, this refers to materials with correspondingly low surface energies of 50 mN/m or less, preferably less than 40 mN/m, and more preferably 35 mN/m or less. The indications of surface energies in the present application refer to determination according to the methods specified in the section "General determination methods".

Natural rubber is—as the name implies—an elastic polymer obtainable from natural products (cis-1,4-polyisoprene) that is derived from plant products, e.g. mainly milky sap (latex).

Natural rubber can be processed into an essential raw material for adhesive compounds referred to as natural rubber adhesive compounds. In general, self-adhesive compounds can be produced in all obtainable qualities, such as crepe, ribbed smoked sheets (RSS), air-dried sheets (ADS), technically specified rubber (TSR), or constant-viscosity (CV) types, depending on the required level of purity and viscosity. In order to adjust the required properties of favourable tack and thermal resistance, it is preferable to subject the natural rubber to a slight degree of mastication during processing, and to use the high molecular weight types rather than the low molecular weight types.

Self-adhesive adhesives, also referred to synonymously as pressure-sensitive adhesive compounds, PSA, are in particular polymeric compounds which at the application temperature (unless otherwise specified, room temperature) are permanently tacky and adhesive and adhere on contact to numerous surfaces—depending on the nature of the self-adhesive compound and the respective substrate—and in particular adhere immediately (showing so-called "tack" [tackiness or initial tack]). They are capable, even at application temperature, without activation by a solvent or heat—optionally under the effect of more or less high pressure—of sufficiently wetting a substrate to be bonded so that sufficient interactions for adhesions can form between the compound and the substrate to be bonded.

In order to adjust their properties to conform to the intended application, self-adhesive compounds can be modified by mixing in of adhesive resins, plasticizers, crosslinking agents, or fillers.

According to the invention, a natural rubber compound is particularly preferably used as the self-adhesive compound, at least for the upper self-adhesive compound layer, and advantageously for both the upper and the lower self-adhesive compound layers, which comprises the following components:

a) 40 to 60 wt % of natural rubber
b) 10 to 50, preferably 20 to 50, and more preferably 30 to 50 wt % of one or a plurality of resins, in particular adhesive resins, with softening points (corresponding to DIN EN 1427:2007) of at least 60° C. ("solid resins")
c) 8 to 40, preferably 8 to 20, and more preferably 8 to 15 wt % of a plasticizer, and
d) optionally up to 10 wt %, and preferably up to 3 wt %, of additional components.

"Additional components" within the meaning of the present application is used to differentiate all further components that do not fall under the definition of the natural rubbers within the meaning of component (a), the solid resins within the meaning of component (b), and the plasticizers within the meaning of component (c). Without further limitation, these can generally be all conceivable materials or substances; for example, other polymeric substances such as natural rubbers, additives, fillers, and the like. Special co-components within the meaning of component (d) will be discussed below.

Preferably, the components a), b), c) and, if present, d) add up to 100%. Ordinarily, the adhesive compound is usually dry when used (drying takes place for example at 120° C. for 10 minutes), so the solvent is largely eliminated from the production process. If residual solvents are present in the adhesive compound (ordinarily in the minimal % or ppm range), they will be included in the plasticizer component.

Preferably, the adhesive compound contains only a very small amount of residual solvent of less than 1%, more preferably less than 0.5%, and most preferably less than 0.2%.

The self-adhesive compounds according to the invention based on natural rubber are characterized by high tack and favourable bonding strengths on nonpolar surfaces, in particular film materials such as polyethylene. They also show favourable thermal resistance.

Tack refers to the so-called initial adhesion of an adhesive compound, i.e. its property of immediately bonding to a respective material.

The term "resin" within the meaning of the present application is a generic term for high- or low-viscosity (liquid) organic products that are solid at room temperature with a more or less broad distribution of relative molar mass. Resins may be of natural origin (natural resins) or artificially produced (artificial resins). They generally show an amorphous structure, quite low molar masses, and relatively high glass transition temperatures. Within the scope of this application in particular, oligopolymeric and (low) polymeric compounds are considered to be resins whose number average molecular weight $M_n$ is not more than 5000, preferably not more than 4000, and more particularly not more than 3000 g/mol. All indications of molecular weights in the present application refer to determination according to the methods given in the section "General determination methods".

The term "tackifier resins", also referred to as "tackifying resins", is understood by the person skilled in the art to mean a resin-based substance that increases tackiness.

Resins corresponding to component (b) have softening points of more than 60° C., preferably 80° C. or more, and more preferably up to a maximum of 150° C. At room temperature, such adhesive resins therefore as a rule show no or little flowability (are highly viscous or solid). Within the scope of this application, therefore, they are referred to as "solid resins" exclusively for the purpose of semantic differentiation from the "soft resins" described in further detail below, with no intention of limiting the properties of the resins by the prefixes "solid" and "soft" other than with respect to their softening points.

All indications of softening points in the present application, for example of oligomeric and polymeric compounds—such as resins in particular—and for example plasticizers, refer to determination according to DIN EN 1427:2007, see experimental section.

According to the invention, suitable solid resins are for example natural and/or synthetic resins, such as pinene and indene resins, colophony and colophony derivatives (colophony esters, as well as colophony derivatives stabilized for example by disproportionation or hydrogenation), polyterpene resins, terpene phenol resins, alkyl phenol resins, aliphatic, aromatic, and aliphatic-aromatic hydrocarbon resins, each selected taking into account the corresponding softening point, to name only a few.

The solid resins are preferably terpene phenol resins and/or colophony resins, and particularly preferably polyterpene resins based on α-pinene and/or β-pinene and/or δ-limonene.

Any desired combinations of these and other solid resins may be used in component (b) in order to adjust the properties of the resulting adhesive compound as desired. In general, all (soluble) resins compatible with the natural rubber which meet the conditions according to the invention for solid resins may be used. Express reference is made to the presentation of the level of knowledge in "Handbook of Pressure Sensitive Adhesive Technology" by Donatas Satas (van Nostrand, 1989).

In addition to the natural rubber component (a) and the solid resin component (b), the adhesive compound according to the invention also contains plasticizers (component (c)). Plasticizers within the meaning of the present application are chemical substances having a softening point of not more than 60° C. They therefore have the advantage of being suitable for use as plasticizing agents. Plasticizers are as a rule non-volatile and in particular are not removed in the drying process. According to the invention, at least one plasticizer is used, but a plurality of plasticizers may also be used, preferably—but not necessarily—selected from the compounds mentioned below.

Examples of plasticizers are low molecular weight polyacrylates, phosphates, or polyphosphates, paraffinic and naphthenic oils, oligomers such as oligobutadienes and oligoisoprenes, liquid nitrile rubbers, liquid terpene resins, and vegetable and animal oils and fats.

The plasticizers within the meaning of the present application also include soft resins. Within the scope of this application, soft resins refer to compounds having the same chemical basis as the solid resins mentioned above, but differ from the former in their softening point, which for soft resins is not more than 40° C., and preferably not more than 30° C. For example, soft resins can be outstandingly selected from the bonding classes described for the adhesive resins—taking into account the specifications on different softening temperatures. As component (c), for example, one may use an individual soft resin, a combination of two or more soft resins, or a combination of a soft resin with one or a plurality of other plasticizers, with said plasticizers preferably being selected from the above list.

Because of their low softening temperatures, many soft resins are in liquid form at room temperature, and they are therefore also referred to as liquid resins. It has been found to be advantageous to select as soft resins those resins that are liquid at room temperature.

In a preferred procedure, the compounds used as plasticizers are exclusively those having a softening point of not more than 40° C., and particularly preferably not more than 30° C., with these being advantageously, but not necessarily, selected from the compounds mentioned in the two preceding paragraphs (low molecular weight polyacrylates, phosphates, or polyphosphates, paraffinic and naphthenic oils, oligomers such as oligobutadienes and oligoisoprenes, liquid nitrile rubbers, liquid terpene resins, vegetable and animal oils and fats, and soft resins).

In a further advantageous procedure, the solid resins of component (b) used and the plasticizers used (component (c)) are selected in such a way that the softening temperatures of the resins of component (b) used and those of the plasticizers used differ by at least 20° C., and preferably at least 40° C.

It is advantageous if, in the self-adhesive compound, the ratio of the amount of natural rubbers, i.e. component (a), to the total amount of the solid resins and plasticizers used, i.e. components (b) and (c), is in the range of 0.75 to 1.60, with the term "amount" referring here to the respective proportional weights (in other words, the proportional weight of the natural rubber divided by the total content by weight of solid resins and plasticizers should yield a value of 0.75 to 1.60).

In a variant embodiment of the invention, the adhesive compound is free of further components [except for the components (a), (b) and (c)], in order to achieve the favourable tack of the base mixture.

However, it has been found to be favourable to add at least antioxidants (anti-ageing agents, stabilizers) as component (d). In order to stabilize the self-adhesive compound, primary antioxidants such as sterically hindered phenols, secondary antioxidants such as phosphites or thioethers, and/or C radical scavengers are ordinarily added.

In a further variant embodiment of the invention, in addition to the components (a), (b) and (c), exclusively antioxidants are mixed in as component (d) ("additional components").

Instead of or in addition to this, it is also possible for the self-adhesive compound to comprise other components (d). In particular, in order to achieve specified properties of the adhesive compound, for example, fillers (additives) may be added, and/or further substances (other than fillers or additives) may be added or present (such as foreign matter resulting from production).

If further components are present in addition to the components natural rubber (component (a)), resins (component (b)) and plasticizers (component (c)), their total content in the self-adhesive compound should preferably not exceed 10 wt %, and more preferably 3 wt %.

Additives (fillers) are used for example to increase the cohesion of a self-adhesive compound. In this case, a combination of filler/filler interactions and filler/polymer-interactions often provides the desired strengthening of the polymer matrix.

In order to increase weight or volume, additives are also mixed into paper, plastics, and adhesive or coating materials and other products. These additives often improve the technical applicability of the products and affect their quality, for example their strength, hardness, etc. Natural inorganic and organic fillers comprise, for example and without limitation hereto, fibres, carbon blacks, zinc oxide, titanium dioxide, chalk (calcium carbonate), solid glass beads, microbeads of other materials, silica, silicates, kaolin, talcum, and dolomite, and can be used in the adhesive compound according to the invention individually or in any desired combination.

Moreover, the self-adhesive compound may contain organic and/or inorganic pigments, which can be used alternatively to the aforementioned fillers or also in combination with one or more further fillers.

In the case of rubber and synthetic elastomers as well, by using suitable additives, quality can be improved, for example with respect to hardness, strength, elasticity, and elongation. Frequently used fillers are carbonates, in particular calcium carbonate, but also silicates (talc, clay, mica), siliceous earth, calcium and barium sulphate, aluminium hydroxide, glass fibres and beads, and carbon blacks.

Inorganic and organic additives can also be distinguished according to their density. For example, the inorganic fillers often used in plastics as well as adhesive compounds, such as chalk, titanium dioxide, calcium, and barium sulphate, increase the density of the composite, as they have a density that is greater than that of the polymers. With the same layer thickness, the weight per unit area is then higher.

In addition, there are additives that can reduce the total density of the composite. These include hollow microbeads, which are highly voluminous light fillers. The beads are filled with air, nitrogen, or carbon dioxide, and the bead shells are composed of glass, or a thermoplastic in some products. The beads can be pre-expanded or incorporated as expandable fillers.

In order to increase the cohesion and thermal resistance of the self-adhesive compound, it can be additionally cross-linked by chemical or physical methods.

An example of a physical method is irradiation with electron beams. Typical irradiation devices used are linear cathode systems, scanner systems, or segment cathode systems, provided that these are electron beam accelerators. An extensive description of prior art and the most important process parameters can be found in Skelhorne, Electron Beam Processing, in Chemistry and Technology of UV and EB formulation for Coatings, Inks and Paints, Vol. 1, 1991, SITA, London. The typical acceleration voltages are in the range of 50 kV to 500 kV, and preferably 80 kV and 300 kV. The scattering doses used vary from 5 to 150 kGy, and in particular from 20 to 100 kGy.

Electron beam hardening causes crosslinking of the self-adhesive compound according to the invention. This results in a significant improvement in the temperature resistance of the self-adhesive compound according to the invention.

All previously known thermally activatable chemical crosslinking agents, such as accelerated sulphur or sulphur donor systems, peroxide crosslinkers, isocyanate systems, reactive melamines, formaldehyde, and (optionally halogenated) phenol formaldehyde resins, reactive phenol resin, or diisocyanate crosslinking systems with the corresponding activators, epoxidized polyester and acrylate resins, as well as combinations thereof, can be used for purposes of thermally induced chemical crosslinking.

Crosslinking agents are preferably activated at temperatures above 50° C., more preferably temperatures of 100° C. to 160° C., and most preferably temperatures of 110° C. to 140° C.

The above-described natural rubber adhesive compounds are particularly preferably used at least as the upper self-adhesive compound of an adhesive tape for flying splices. In the splicing method, the upper self-adhesive compound serves in advantageous methods to bond the upper side of the adhesive tape according to the invention to the beginning of the web of the new roll and to the almost depleted web of the old roll, thus mutually bonding the webs of the rolls by means of the adhesive tape. The lower self-adhesive compound serves in particular to bond the underside of the adhesive tape according to the invention to the second highest coil, causing the upper and the second-highest coil of the new roll to be bonded to one another via the adhesive tape. In the further course of the splicing method, when the predetermined breaking point of the adhesive tape fails, the bond between the two upper coils of the roll is again broken, most preferably in such a manner that the adhesive areas of the upper self-adhesive compound and the lower self-adhesive compound facing away from the upper side of the respective coil are non-adhesively covered by the now split backing.

All adhesive compounds can generally be used as the lower self-adhesive compound. For the lower adhesive compound, adhesive compounds are preferably used whose complex viscosity is adjusted so as to prevent cold flow. Because of this, the lower adhesive compound, in particular when it is provided on the underside of the structural unit forming the predetermined breaking point—such as a splittable backing—will not escape from the adhesive joint and bond to the upper side of the structural unit forming the predetermined breaking point, thus preventing blocking of the predetermined breaking point and allowing the system to remain splittable.

In a particularly preferred procedure, a natural rubber compound is also used as the lower self-adhesive compound, preferably a natural rubber compound such as that described in further detail above, and more preferably an adhesive compound identical to the upper self-adhesive compound. The reason is that an adhesive compound that is designed for nonpolar surfaces is advantageous in this case as well.

The adhesive tape according to the invention is characterized by its suitability for flying splices, i.e., it has at least one upper and one lower adhesive compound and one intermediate inner adhesive tape area that is configured as a flat predetermined breaking point. Said predetermined breaking point is configured so that it can split in laminar fashion such that the upper adhesive compound layer and the lower adhesive compound layer are separated from each other.

The adhesive tape can be configured in various ways. In a first variant embodiment, the adhesive tape consists of an upper and a lower adhesive compound layer as well as a third single-level flat splittable layer arranged between these two layers (splitting layer). Preferably, this can be a backing layer, and more preferably, a splittable paper is used for this purpose (see below).

In a further advantageous embodiment, the splittable layer is configured in two layers, with the two backing layers in particular being bonded to each other in such a way that they can easily be detached from each other by applying a force perpendicularly to the layer surfaces. Here, the bond may be created by a physical-mechanical method, for example stamping or the like.

The bond between two layers that can be delaminated from each other can also be produced by adding a chemical substance that initially holds the layers together.

For example, the backing layers can be "glued together," e.g. with a solution, suspension, dispersion, etc. of a chemical substance, after which the solution, suspension, dispersion, or the like is subsequently dried so that it holds the backing layers together, in such a way, however, that they show no tack or pressure-sensitive adhesiveness in the form of dried films, even at higher temperatures, so that the surfaces exposed after separation of the composite do not soil any machine components or production goods.

Laminating adhesive compounds, lacquers, or the like can be used as a chemical substance for joining the backing layers (see below). In this case, the chemical substance can be applied over the entire surface or only partial areas, such as in the form of strips, points, or the like. Examples are application in a stripe, application by screen printing, and so on.

In a further embodiment, the lower adhesive compound layer is applied to a backing layer, with the backing layer being equipped with a functional layer in such a way that in the process of splitting, this functional layer is fully detached from the backing layer or is detached in the form of a partial layer, with the functional layer itself splitting in laminar fashion. This can also be achieved by a configuration in which two or more functional layers that can separate from one another are present.

The aforementioned embodiments may be modified by providing further layers in the adhesive tape, in particular between the upper adhesive compound layer and the splittable layer. Such layers may for example be layers that allow detection of the adhesive tape, such as metal layers, and/or layers that impart additional stability to the adhesive tape. Further—inner—adhesive compound layers and/or dyed layers (layers bearing dye particles, lacquer layers, or the like) may also be provided.

The design of the adhesive tape according to the invention can be further adapted for its purpose of application. Specially designed adhesive tapes for flying splices are shown for example in the following documents; the embodiments disclosed in these documents are also implementable for the present invention and are considered to constitute advantageous embodiments: EP 818408A; EP 881046A; EP 860489A; EP 970904A; EP 1022245A; EP 1104795A; EP 1355843A; EP 1258441A; WO 2003018454A; WO 2003018453A; WO 2003018451A; WO 2003024850A; EP 1342684A; EP 2048212A; EP 2130886A; EP 2130887A; EP 2130888A; EP 2130889A; WO 2011069821A; EP 2571949A; EP 1428861A; EP 1645533A; EP 1604927A; WO 2007048695A; EP 2113543A; EP 1215287A; and WO 1995029115A.

For example, adhesive tapes which comprise at least one main backing on the upper side of which the upper self-adhesive compound layer is provided have been found to be highly suitable for flying splices and are also highly advantageous within the meaning of the present invention.

By using a mechanically stable non-splittable material for the main backing in the splicing method, one can sharply increase the efficiency of bonding of the web of the old roll to the beginning of the web of the new roll. In particular, all typical sheet-type backing materials for adhesive tapes can be used as main backings, for example paper backings, in particular solid paper backings such as those composed on smooth paper coated on one or both sides, as well as film backings such as BOPP films, PET films, aluminized PET films, and aluminium films. In this case, it is preferred to use a tear-resistant main backing. The upper self-adhesive compound layer may lie directly on the main backing, or one or a plurality of further layers—such as detection layers, dye layers, further backing layers, further adhesive compound layers and so on—may be located between the upper adhesive compound layer and the main backing layer.

In an advantageous procedure, a splittable system is provided directly or via intermediate layers on the underside of the main backing comprising at least one splittable layer, in particular as described in further detail above, as well as a lower self-adhesive compound layer. In particular, the lower splittable system can be anchored to the underside of the main backing by means of a further adhesive compound layer. However, the lower splittable system can also be configured with the lower adhesive compound layer and one or a plurality of functional layers, of which at least one functional layer—or a partial layer thereof—can detach from the main backing.

The lower splittable system may comprise further layers, for example further functional layers—such as detection layers and dye layers —, further backing layers, further adhesive compound layers, or the like.

The lower splittable system may cover the entire surface of the main backing, but in particular may also include only a partial surface of the underside of the main backing.

In addition to the splittable system, one or a plurality of further similar or different splittable systems and/or non-splittable adhesive systems can be provided on the underside of the main backing—directly or via further intermediate layers.

In a particularly preferred embodiment, the lower splittable system is applied in the form of a strip, which extends in an advantageous embodiment of the adhesive tape parallel to one of its edges, i.e. in particular in a straight line. Advantageously, such an adhesive compound strip extends—in particular in a straight line—in the longitudinal direction (l) of the adhesive tape, i.e. on or parallel to one of the longitudinal edges of the adhesive tape.

Ordinarily, adhesive tapes have an elongation in a first direction (l) that is much greater than the elongation in a second direction (b) defined as perpendicular thereto; this first direction is therefore referred to within the scope of this application as the longitudinal direction (l), and the elongation in this direction as the length ($l_K$) of the adhesive tape. The second direction is referred to as the transverse direction (b), and the elongation in this second direction as the width ($b_K$) of the adhesive tape. The flat elongation of the adhesive tape is determined by its length ($l_K$) and width ($b_K$).

In contrast, the thickness ($d_K$) of the adhesive tape—its elongation in the third direction, defined as perpendicular to the first and second direction and thus to the surface area of the adhesive tape (d) in the cartesian coordinate system—is ordinarily much less than the width of the adhesive tape.

However, the adhesive tape according to the invention can also be in the form of adhesive tape sections ("labels"), in which the length and width of the adhesive tape are in a similar order of magnitude.

In a preferred embodiment, the lower splittable system applied in the form of a strip is oriented parallel to the longitudinal edge of the adhesive tape lying closest to said system and indented at a distance A from this longitudinal edge. The indentation should advantageously be up to 10 mm, preferably 0.5 to 5 mm, and more preferably 1 to 3 mm. A special embodiment of the adhesive tape according to the invention shows an indentation of 2 mm.

In a further particularly preferred variant embodiment, the lower splittable system is provided in the form of a strip which, although it runs as a whole in the longitudinal direction (l) of the adhesive tape, itself does not have any straight edges. For example, this can have an appearance such that one can define an imaginary straight line in the longitudinal direction of the adhesive tape, which in particular runs parallel to at least one of the longitudinal edges of the adhesive tape, with this line dividing the strip of the adhesive compound layer—looking at said strip from a top view—into two equal sized surface areas. Preferably, the adhesive tape is conceptually formed by a series of adhesive tape sections, for each of which the corresponding adhesive compound section lying thereon is divided into two sections of equal area by the imaginary line.

A strip according to the invention not having straight edges can be configured, for example, so that it has one left and one right boundary edge, with at least one of these two edges not being straight, such that the non-straight edge has protrusions which can constantly be differentiated at the sites protruding the farthest and have a tangent running parallel to the imaginary line; in particular, these are protrusions that have a rounded configuration at the sites protruding the farthest. Such strip shapes are defined for example in EP 1948545A. Explicit reference is made to the line shapes described in the claims of WO 2007/48695A and EP 19485458 and the line shapes shown in the figures of these documents—in particular in FIGS. 1, 2, 3, 4, 5, 6, and 7 of WO 2007/48695A—together with the accompanying disclosure; these line shapes are also outstandingly implementable for the present invention. Particularly advantageous are symmetrical wave shapes according to FIG. 7 of WO 2007/48695A and modified variants thereof, for example with one wavy edge and one straight edge, with wavy edges having a different curvature or with wavy edges whose maxima are displaced relative to one another. For example, mirrored edge shapes on the imaginary line can also be implemented.

Moreover, a strip according to the invention not having straight edges can also be configured such that at least one of its boundary edges is in the form of a curve extending parallel to the imaginary line and is characterized by a succession of rising and falling curve sections, so that a maximum or a plurality of maxima are formed between a respective rising curve section and a subsequent falling curve section in the curve area formed by these two curve sections, and a minimum or a plurality of minima are formed between a respective falling curve section and a subsequent rising curve section in the curve area formed by these two curve sections, with the slope in the respective rising curve section and the respective falling curve section not being the same.

Such curves, which are also advantageous for the present invention, are shown for example in EP 2130887A, and explicit reference is made to the line shapes described in the claims and the line shapes shown in the figures of these documents—in particular in FIGS. 2, 3, 3a, 4, 5, 6, and 7—together with the accompanying disclosure.

Further edge shapes for strip edges not running in a straight line that can be implemented within the meaning of the present invention are shown in EP 2615049A; particular reference is made to the claims, FIGS. 2, 3, 4, 6, 6, 7, 8, 9, and the accompanying explanations, which disclose the geometries shown therein on a strip according to the present invention.

On the underside of the main backing, a plurality of splittable systems—particularly contiguous systems—can be provided, for example in the form of a plurality of—not mutually bonded—straight or not straight strips, for example wave-shaped strips or the like.

Such an embodiment has two, three or more strips running parallel in the longitudinal direction of the adhesive tape, each of which has a predetermined breaking area. These predetermined breaking areas can be configured in particular in the manner discussed in further detail with respect to the predetermined breaking areas of this application, for example by using flat splittable papers, splittable laminates of two or more papers, two or more films, two or more other flat materials, or also by using mixed laminates, for example of paper and films; and also by means of surface coatings of the main backing layer that allow the underlying strip material to be split off (see above for further details). Other configurations of the predetermined breaking areas can also be implemented.

It is advantageous if the first of these strips is at a distance from the longitudinal edge of the adhesive tape lying closest thereto, as described above for the adhesive tape with one strip, in particular with dimensions indicated above.

For example, a system with two strips can also have a strip with at least one non-straight, in particular wave-shaped edge—specifically two non-straight, specifically wave-shaped edges —, for example as shown in WO 2011/144466A.

The rear side adhesive compound layers, for example, in particular those with a linear strip shape [having two parallel edges in the longitudinal direction (l) of the adhesive tape], respectively and independently from one another, have widths ($b_s$) of 3 mm to 30 mm, preferably 5 mm to 18 mm, and more preferably 15 mm to 9 mm. Wave-shaped adhesive systems, for example, can have widths (the width of a strip running in non-linear fashion ($b_s$) is understood to refer to the maximum elongation of the respective strip in the transverse direction (b)) of 20, 30, or 40 mm. However, the aforementioned indications by no means limit the selectable widths. It is also advantageous to select the aforementioned dimensions in cases where there is only one strip-shaped rear side adhesive compound layer.

In an advantageous adaptation to the respective use, a variant of the adhesive tape according to the invention can also be preferably used in which the single strip-shaped rear side adhesive compound layer or—in the case of a plurality of strips—in which the rear side adhesive compound layer lying closest to the longitudinal edge is directly adjacent to said longitudinal edge, i.e. is not indented.

The splittable layers (predetermined breaking areas) of adhesive tapes according to the invention, in particular the embodiments discussed above, may for example be configured as follows:

All splittable flat backing materials are suitable as splittable backings, in particular readily splitting papers, kraft papers, paper composite systems (such as duplex papers and glued paper systems), film composite systems (such as glued film systems), polymeric composite systems (such as coextruded polymeric composite systems), and polymeric nonwoven materials.

A splittable backing is preferably used that shows a significantly lower splitting strength than a backing that must absorb tensile forces. Particularly preferred is the use of a splittable backing having significantly lower tear resistance than a backing or a backing layer that absorbs the actual tensile forces in the main layer of the adhesive tape (i.e. as the main backing H) in order to bond the two material webs to each other. The system backing therefore splits before the main backing is destroyed. The splittable system(s) is/are preferably paper based. Particular examples thereof are the following papers or paper composite systems:
- glued high-density papers
- easily splittable paper systems such as non-moisture-resistant papers
- kraft papers (such as double-sided smooth kraft papers—a kraft paper 55 µm in thickness and having a weight per unit area of 65 g/m² has been found to be particularly suitable)
- duplex papers (defined as laminated papers, with a highly homogeneous splitting process; these do not show tension peaks, e.g. resulting from non-homogeneous compression. These papers are also used for the production of wallpapers and filters.)
- splittable systems in which the splitting forces are determined by the size of the bonding points; such splittable systems are described for example in DE 198 41 609 A1.

Examples of chemical substances suitable for the bonding of two backing layers that are detachable from each other or other mutually detachable layers (such as the lower adhesive layer of a backing layer) include compositions containing, in addition to a binder, other substances having an effect on splitting and elastifying additives, and which in particular can be produced by a water-based method and/or are coatable. For example, such compositions may contain 10 to 90 wt % of binders, 10 to 90 wt % of separating agents, optionally up to 60 wt % of elastifiers, up to 30 wt % of fillers, and thickeners. Suitable binders are preferably modified starches, preferred separating agents include talcum, stearyl derivatives, or dispersions of polymeric silicone and fluorine-free separating agents, and preferred elastifiers are water-soluble polyglycols or gum arabic. A further compound according to the invention that is outstandingly suitable for producing the surface coating comprises as binders at least one polysaccharide component—such as starch or starch derivatives—and one surface-active component consisting of one or a plurality of surfactants—such as disodium-n-octadecyl sulphosuccinate, sodium dialkyl sulphosuccinate, sodium-n-dodecyl sulphate, sodium lauryl sulphate, ammonium lauryl sulphate, sodium oleyl cetyl alcohol sulphate, fatty alcohol polyglycol ethers, fatty alcohol ethoxylates, nonyl phenol ethoxylates—and optionally elastifying additives—such as polyglycols or gum arabic.

Such compositions are described for example in the documents EP 1076026A and EP 2116581A as laminating compounds, and are also favourable for use in the present invention.

A composition based on polymeric compounds can also be used as a chemical substance. According to the invention, polymers such as those disclosed in WO 99/46196A, specifically on page 9, lines 15 to 29, can be quite advantageously used. For example, the polymer for the polymer layer in particular can advantageously be selected from the group comprising polyvinyl chlorides, polyvinylidene chloride, polyvinyl alcohols, polyvinyl acetates, polyvinyl pyrrolidones, and copolymers of vinyl chloride and vinyl acetate. Examples of suitable additives include wetting agents, defoaming agents, plasticizers, and/or fungicides.

A preferred polymer that is disclosed in the above-mentioned document and is also outstandingly suitable for use in the present invention is a repulpable polymer, for example based on polyvinyl alcohol, and preferably also comprising one or a plurality of plasticizers. Particularly preferred for use as plasticizers are compounds such as polyols (such as diethylene glycol), hydroxy-modified rubbers, or a combination of the two.

Primer coatings such as those known from the building and do-it-yourself areas for the preparation of paints, plasters, adhesives, and ground levelling compounds, particularly those used for pretreatment of absorbent substances such as gypsum building materials or particle boards, have been found to constitute an outstandingly suitable system for the polymer layers of the bonding element according to the invention. Reference is made here to polyacrylate-based primer coatings in particular.

In the adhesive tape according to the invention, the upper and the lower adhesive compound layers respectively are external adhesive compound layers, i.e. in particular adhesive compound layers that are capable during use of bonding to a respective substrate surface—a respective flat web in use in the flying splice method in particular. The term external adhesive compound layers does not exclude the possibility that the first adhesive compound layer and/or the second adhesive compound layer prior to use—in particular for improved handling and/or storage and/or to protect the exposed adhesive compound surfaces—can each be covered with a separating cover (also referred to as a "liner" or "release liner"). The release liner is then removed before the exposed adhesive compound surface is needed for use.

All materials having a separating effect known per se for this purpose can be used as material for the release liner; particular examples include antiadhesive materials or antiadhesively coated (particularly siliconized) materials, such as silicones, siliconized papers, glassine papers, coated or uncoated HDPE liners (low pressure polyethylene), coated or uncoated LDPE liners (high-pressure polyethylene), coated or uncoated MOPP and BOPP liners (monoaxially or biaxially oriented polypropylene), coated or uncoated PET liners (polyethylene terephthalate), and the like.

In particular, the release liner on the upper adhesive compound layer can have one or a plurality of slits, one or a plurality of perforations or the like, in particular in the longitudinal direction of the adhesive tape. For example, in a specified phase of the splice preparation, a part of the release liner on the upper adhesive compound layer can be peeled off, while another part remains in place for the time being.

With respect to the suitability of the adhesive tape according to the invention in use as intended, the forces acting on the predetermined breaking area required in order to initiate the splitting process in flying splices and the force required in order to further split the predetermined breaking area are of decisive importance. These values should be adjusted such that initial and further splitting at the predetermined breaking point only occur during use as intended, but then occur reliably without hindering the process of flying splices. In this case, the splitting system should preferably be adjusted so that on the one hand, the risk of unintentional initial splitting in the acceleration phase is avoided, and on the other, so that splitting of the splicing tape in accordance with the application without damage to the material web to be bonded is ensured.

In order to overcome the splitting resistance on the front edge, an increased maximum force is required for initial splitting of the system (splitting force, initial splitting force required to initiate the splitting process at the predetermined breaking point). Moreover, lower-level force is required for splitting over the entire width of the splicing tape (continuing splitting force). The product of the force applied and the width of the splitting systems is the work required for splitting (splitting work).

On the one hand, the splitting force should be set sufficiently high so that the product does not prematurely open due to the centrifugal forces and aerodynamic forces acting during acceleration, and on the other hand, the splitting work must be set sufficiently low that the work required for complete splitting of the predetermined breaking area does not lead to tearing. The embodiment of the adhesive tapes according to the invention allows outstanding values for these parameters to be achieved.

In a preferred embodiment of the invention, the splitting force required for splitting the predetermined breaking point of the adhesive tape according to the invention is in the range of 0.1 N/cm to 2.0 N/cm (Newtons per centimetre of bonding width), and the force required for splitting the predetermined breaking area (continuous splitting force) is between 5 and 50 cN/cm. All indications of initial splitting forces and continuous splitting forces in the present application refer to determination according to the methods described in the section "General determination methods".

Production of the self-adhesive compounds used in the adhesive tape according to the invention is advantageously carried out by compounding of the rubber and the further components and optional mastication or degradation of the rubber, for example according to known methods. The production of layers of the self-adhesive compound used in manufacturing the adhesive tape according to the invention can also be carried out by common coating methods known to the person skilled in the art. In this case, the self-adhesive compound can be coated onto a backing film or separating film, including the additives, dissolved in a suitable solvent, e.g. by means of anilox roll application, comma blade coating, multiple roll coating, or in a pressure process, and the solvent can then be removed in a drying channel or drying oven. Alternatively, coating of the backing film or separating film can also be carried out by a solvent-free method, particularly in cases where compounding is also carried out by a solvent-free method. Further process steps, such as mixing with the additives described above, filtration, or degassing, can be carried out in the extruder. The melt is coated onto the corresponding backing using a calender or first coated onto a temporary backing from which further lamination can be carried out.

Possible methods by which the adhesive can be produced are disclosed in DE 198 06 609 A1, as well as in the documents WO 94/11175A1, WO 95/25774A1, and WO 97107963A1.

Moreover, the invention concerns a splicing method for flying splices of flat web material wound onto rolls, in particular as already briefly described above. In a method preferred according to the invention, the upper coil-forming flat web section of a roll of a new flat web is first prepared with adhesive tape configured according to the invention that comprises an upper self-adhesive compound layer, an inner adhesive tape area adapted as a flat predetermined breaking point, and a lower self-adhesive compound on the underside of the inner adhesive tape area, and a natural rubber adhesive compound is used as the self-adhesive compound for at least the upper self-adhesive compound layer, to which the underlying flat web section is fixed. This preferably takes place in such a way that a surface area of the front side first adhesive compound layer required for the splicing process is exposed. After this, the new roll thus equipped is placed next to an almost fully depleted old roll to be replaced and is accelerated to essentially the same circumferential speed as said old roll. The roll is then pressed against the old web unwinding from the old roll, wherein the exposed surface area of the front side adhesive compound layer of the adhesive tape is bonded to the old web at essentially the same web speeds. In order to improve bonding reliability, it is advantageous to apply counter-pressure from the rear side of the web during the bonding process using a pressing device (a roller, brush, or the like). Simultaneously with or immediately after the bonding, flat splitting or layer separation takes place. The respective material residues remaining on the adhesive tape remnants cover the adhesive tape layers, with the result that no adhesive areas remain exposed after the splitting or separation.

In an improvement of the method according to the invention, the adhesive tape is bonded perpendicularly to the running flat web. In an advantageous variant of the method according to the invention, bonding of the adhesive tape can also be carried out at an acute angle of up to 30° to the running web, and in particular up to 5°.

In an advantageous procedure in the splicing process, an adhesive tape configured according to the invention is bonded in a straight line under the uppermost coil of the new flat web to a new flat web roll. Here, bonding takes place in such a way that a part of the adhesive tape remains free for bonding with the unwinding web.

Preferably, the adhesive tape is bonded in a straight line under the uppermost coil of the flat web of the new roll, so that a part of the adhesive tape remains free, while the rear side adhesive compound layer(s) of the adhesive tape bond to the underlying flat web and thus stabilize the uppermost web coil, wherein optionally only a part of the covering optionally located on the first front side adhesive compound is peeled off so that the part of the adhesive compound layer required for the splicing process is still covered by the covering and the roll in this state does not show any freely bonding surface. After this, in order to complete preparation of the splicing process, the optionally still present remaining covering is removed, and the new roll thus equipped is placed next to an almost fully depleted old roll to be replaced and accelerated to essentially the same circumferential speed as the latter, then pressed against the old web unwinding from the old roll, wherein the exposed area of the front side adhesive compound layer of the adhesive tape bonds to the old web at essentially identical web speeds, while simultaneously with or immediately after this, the adhesive tape splits essentially in the area in which it is equipped with the second rear side adhesive compound layer (or second rear side adhesive compound layers), and the rear side adhesive compound layer(s) cover/covers the predetermined breaking area with the residues in a non-adhesive manner.

In further variants, an adhesive tape according to the invention is used in the splicing method, in which preparation of the new roll is carried out not by bonding of the adhesive tape to the underside of the web end of the new web, but to the upper side. Such adhesive tape configurations and methods are described for example in the documents EP 970905A or WO 2003/024850A; the splicing methods presented therein can also be carried out in an outstanding manner with corresponding adhesive tape configurations having predetermined breaking points according to the invention, and are to be included in the scope of the invention.

General Determination Methods

Unless otherwise indicated in individual cases, the test climate for all measurements is as follows: temperature 23±1° C.; relative humidity 50±5%, and air pressure 1013±5 mbar.

1. Molar Masses

Number average molar mass Mn and weight average molar mass Mw as indicated in the present application refer to determination by gel permeation chromatography (GPC).

Determination is carried out on a 100 µl clear-filtered sample (sample concentration 4 g/l). Tetrahydrofuran with 0.1 vol % trifluoroacetic acid is used as an eluent. Measurement is conducted at 25° C. A column of the model PSS-SDV, 5 µm, $10^3$ Å, 8.0 mm*50 mm (indications here and below in the following order: model, particle size, porosity, inner diameter*length; 1 Å=$10^{-10}$ m) is used as a precolumn. A combination of columns of model PSS-SDV, 5 µm, $10^3$ Å as well as $10^5$ Å and $10^6$ Å, with 8.0 mm*300 mm in each case, is used for separation (columns from the firm Polymer Standards Service; detection using the Shodex R171 differential refractometer). The flow rate is 1.0 ml per minute. Calibration is carried out for polyacrylates against PMMA standards (polymethyl methacrylate calibration) and in other cases (resins, elastomers) against PS standards (polystyrene calibration).

2. Softening Point

Tests of the softening point $T_E$ are carried out by the ring and ball method according to DIN EN 1427:2007, i.e. by the ring and ball method according to DIN EN 1427:2007 with corresponding use of the tests, but using the sample of the corresponding substance (such as, and oligomer or polymer sample) instead of bitumen, with all of the other procedures being identical; measurements are carried out in a glycerol bath.

3. Surface Energies

Surface energies (surface tensions) are determined according to DIN ISO 8296. For example, test inks from the firm Softal can be used for this purpose. The inks are available in the range of 30 to 72 mN/m. The ink is applied to the surface in an ink stripe. If the ink stripe contracts in less than 2 seconds, the measurement is repeated with an ink having a lower surface energy. If the ink stripe remains unchanged for longer than 2 seconds, the measurement is repeated with an ink having a higher surface energy until a time of 2 seconds is reached. The value indicated on the bottle then corresponds to the surface energy of the film.

4. Splitting Force

In order to determine splitting force (the initial force required to initiate the splitting process at the predetermined breaking point), flat samples are produced (such as in DIN A4 size), which comprise a backing layer with a first and a second surface, with the first adhesive compound layer being indirectly or directly provided on the side of the first surface of the entire backing layer (depending on the structure of the adhesive tape whose splitting force is to be determined), and with the second surface of the backing layer in particular being provided over the entire surface of a second adhesive compound layer, with the second surface of the backing layer being modified according to the invention with a surface coating, and with the specifications of the main claim being met. If adhesive tapes are to be tested in which the predetermined breaking areas show interruptions in the longitudinal direction of the adhesive tape (are segmented), flat samples having a correspondingly interrupted second adhesive layer are produced.

An edge of the flat sample is then cut off so as to form a smooth cut edge. A tear-resistant paper is placed on the second adhesive compound layer of the sample to be tested, and the free adhesive compound surface is covered with siliconized paper. The tear-resistant paper is gently smoothed with the fingers in order to prevent air bubbles. A hand roller is then quickly rolled over the composite in order to achieve outstanding bonding strength. The bond is to be produced in such a manner that the end of the tear-resistant paper protrudes beyond the body of the adhesive tape at the smooth edge. A steel ruler is used to cut out strips on the sides of the smooth edge of the composite, whose width (parallel to the smooth edge) is 15 mm and whose length (perpendicular to the smooth edge) is approx. 20 cm, and the protruding paper end is situated at one end thereof. This protruding paper end is used in the following as a handle.

The measuring device for measuring the splitting force is shown schematically in FIG. 1. A sample 11 produced as described above is clamped into a tensile testing device, wherein the siliconized paper on the front side adhesive compound layer is peeled off and the sample with its now exposed surface is firmly bonded horizontally onto a backing 14 clamped into the tensile unit (by means of a clamping device 16) (shown at the bottom in the figure), and the handle of the paper 12 on the rear side adhesive compound layer is clamped into the tensile unit (by the clamping device 15) of the tensile testing device. It should be noted that before measurement is begun, the predetermined breaking point cannot yet have begun to split. One then pulls on the handle of the paper 12 applied to the rear side adhesive compound layer at a rate of 300 mm/min in such a way that the sample splits at a 90° angle. Here, splitting takes place at the predetermined breaking point. The initial force is recorded (this corresponds to the maximum of the force-displacement curve), and the measured value is standardized to a 1 cm sample width taking into account the actual sample width. The average of the measurements is given (in N/cm).

5. Continuing Splitting Force

In order to determine the continuing splitting force, corresponding sample strips are produced, with the sole difference that tear-resistant papers with handles are provided both on the surface of the first and on the surface of the second adhesive compound (on the lower surface instead of the siliconized paper).

Figure 2:
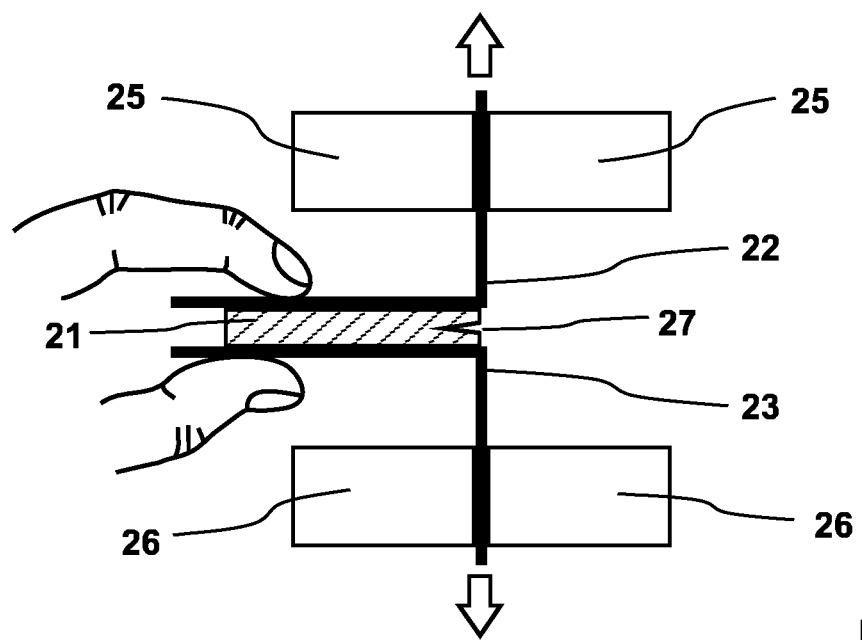
FIG. 2 schematically depicts the measurement of the continuing splitting force.

For measurement of the continuing splitting force—see FIG. 2—the sample 21 prepared in this manner is first manually split on one of the narrow edges (indicated in FIG. 2 by the split 27). The sample 21 is then clamped into the clamps 25, 26 of a tensile testing device by the two handles of the covering papers 22 and 23 and fixed in place in such a way (such as by holding with the fingers), that said sample is perpendicular to the two tensile directions and the splitting process continues at the split 27 when the tensile testing device is put into operation. One pulls on the two handles in the same manner so that the sample continues to split at an angle of 180° and a rate of 300 mm/min. This splitting takes place at the predetermined breaking point. What is indicated is the force, standardized to a sample width of 1 cm, that is required in order to continue the splitting process (given in cN/cm).

Experimental Section
Measuring Methods
Storage

For the tests described in the following, the samples are stored for at least 24 hours at 23° C. and 50% rel. humidity.

6. Adhesive Strength

Testing of peeling strength (adhesive strength) is carried out in conformity with PSTC-1.

A 2 cm wide strip of the self-adhesive tape composed of a 62 µm thick paper backing and a 55 µm thick adhesive coating applied thereto is bonded to the test substrate in the form of a polyethylene plate (PE plate) (surface energy 29 mN/m, see section "General determination methods") by five-time double rolling using a 4 kg roller.

The surface of the PE plate is cleaned with ethanol two hours before measurement. The plate is clamped into place, and the self-adhesive strip is peeled off via its free end on a tensile testing device at a peeling angle of 180° and a rate of 300 mm/min (or at the other rates indicated), and the force required for this is determined. The measurement results are given in N/cm averaged over three measurements and standardized to the width of the strip.

The initial adhesive strength (adhesive strength PE) was measured immediately following bonding and a maximum of 10 min after bonding.

7. Microshear Path Measurement

Figure 3:
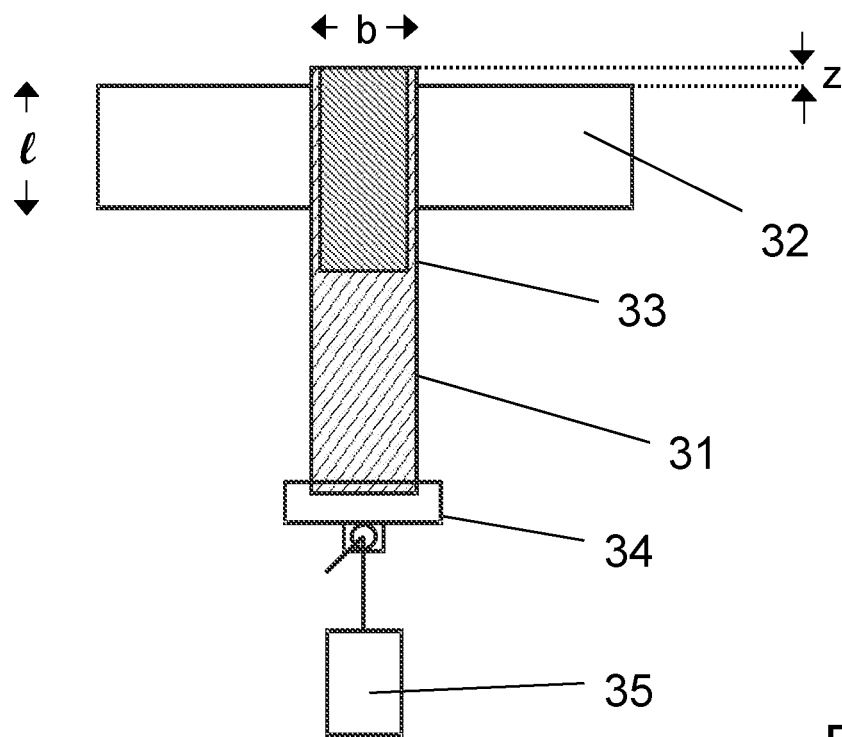
FIG. 3 schematically depicts the measurement of the microshear path.
Figure 4:
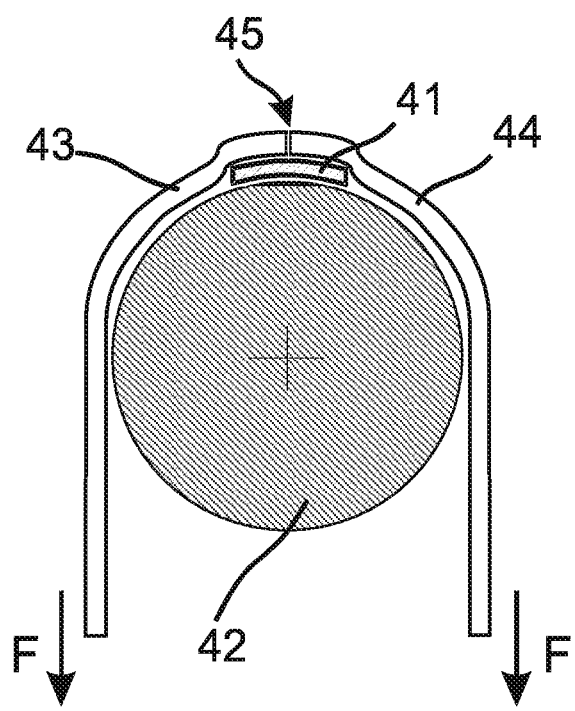
FIG. 4 schematically depicts the measurement of the heating cylinder test.

The measuring device is shown in FIG. 3.

A flat piece measuring 10 mm×50 mm was cut from the adhesive tape to be tested, and the adhesive tape sample (31) obtained in this manner was bonded to a polished, temperature-controllable, acetone-cleaned 13 mm wide steel test plate (32) in such a way that the longitudinal direction of the adhesive tape sample was oriented in the transverse direction of the steel plate, the dimensions of the bonding surface were l×b=13 mm×10 mm, and the adhesive tape protruded beyond the steel plate on one side by a length of z=2 mm. For fixation, a 2 kg steel roller was then rolled over the adhesive tape six times at a speed of 10 m/min. On the side of the adhesive tape (31) facing away from the steel plate (32), the adhesive tape (31) was reinforced, flush with the steel plate, on the edge protruding beyond the plate by a length of z with a stable adhesive strip (33) (dimensions 4 mm×25 mm; backing 190 µm thick PET film), which served as a substrate for a path measurement sensor (not shown). The arrangement prepared in this manner was suspended vertically in such a way that the piece of length z of the adhesive tape sample (31) protruding beyond the steel plate (32) faced upward. The steel test plate (32) with the bonded sample (31) was adjusted to a temperature of 40° C., and the adhesive tape sample to be measured (31) was loaded at its lower end by means of a clamp (34) at time t0=0 with a weight (75) of 200 g. The deformation of the sample under shear stress for a period of 15 minutes (beginning at t0) and at a temperature of 40° C. and relative humidity of 50±5% was measured using the path measurement sensor.

The shear path after 15 min (maximum value; downward movement path of the upper edge of the probe covered during measurement) was indicated in µm as the result. The shear path measured in this way is a quantitative measure of the inner strength of the measured probe.

8. SAFT Test (Shear Adhesion Failure Temperature Test)

This test is used for quick testing of the shear strength of adhesive tapes under temperature stress. Preparation of the measurement sample corresponds to the preparation described for microshear path measurement. However, instead of determining deflection at a constant temperature of 40° C. and a load of 200 g, the sample to be measured is loaded with a weight of 50 g. The steel test plate with the bonded sample is heated at a rate of 9° C. per minute, beginning at 25° C., to a final temperature of 200° C. The deformation of the sample is determined by means of the path measurement sensor relative to temperature and time. The maximum sliding distance is set at 1000 µm, and the test is interrupted if this value is exceeded. Test climate: room temperature 23±3° C., relative humidity 50±5%. The temperature in ° C. on reaching a deformation of 1000 µm is recorded as the test result.

9. Rolling Ball Tack

Measurement of rolling ball tack is carried out according to the method PSTC-6 (Test Methods for Pressure Sensitive Adhesive Tapes, 15th Edition; publisher: Pressure Sensitive Tape Council, Northbrook (Illinois), USA), with the following modifications being made:

use of stainless steel ball bearings (stainless steel 1.4401), diameter 7/16 in., weight 5.7 g preparation of the ball bearings: thorough cleaning with cellulose and acetone; the clean ball bearings are stored in an acetone bath for 15 min before the measurement series (ball bearings are completely surrounded by acetone); at least 30 min before the beginning of measurement, the ball bearings are removed from the acetone bath and stored open in a normal climate (23±1° C., 50±5% rel. humidity) each ball bearing is used for only one measurement.

Determination of initial tack was carried out as follows: so-called "rolling ball tack" was determined as a measure of initial tack with an extremely short contact time. A strip of the adhesive paper approx. 25 cm in length was horizontally fixed on the text surface under tension with the adhesive side facing upward. For measurement, the steel ball bearing was accelerated by rolling down a 65 mm high ramp (angle of inclination: 21°) in a normal gravitational field. The ball bearing was guided from the ramp directly onto the adhesive surface of the sample. The path travelled on the adhesive compound until the bearing came to a stop was measured. The rolling path length determined in this manner is used in this case as an inverse measure of the initial tack of the self-adhesive compound (i.e., the shorter the rolling path, the higher the initial tack, and vice versa). The respective measured value was determined (as a measurement of length in mm) from the average of five individual measurements on five different adhesive tape strips respectively.

10. Heating Cylinder Test

The heating cylinder test measures the strength of bonding under temperature and tensile stress. In use of the adhesive tapes according to the invention for bonding of films in flying splices, for example, this test is intended to simulate the shutdown of a production machine. The bond must not become detached during such a short-term shutdown.

A metal cylinder of stainless steel (external diameter 50 mm, wall thickness 1 mm) (42) with a frame is heated in a heating cabinet for at least 30 min. The heating cabinet is adjusted to the temperature to be tested (140° C., 160° C.). 50 mm×20 mm samples (41) are cut from the adhesive tape. Using the samples (41), two 20 mm×150 mm long film strips (43, 44) are glued in the centre in contact with each other (position 45) (FIG. 4), so that each film strip is entirely covered by the samples along a length of 25 mm. For fixation of the bond, the bonded surface is rolled over once with a 500 g steel roller at a speed of 166 mm/sec. The test piece is placed over the metal cylinder (42) with the bonded surface facing upward and outward. A weight of 500 g each is then applied to the two ends of the test piece by means of clamp (resulting tensile force F). Suspension and stressing are carried out within 40-60 seconds after rolling.

As soon as the weights are fixed in place, the stopwatch is started. The test is considered to be passed if the bond has not yet completely failed (falling of the weights) after 3 min. The test result is then indicated with >180 s. Threefold determination is conducted. If the bond detaches, the time until the weights fall is measured with the stopwatch, and the result is recorded in seconds.

Preparation of the Self-Adhesive Compounds

The self-adhesive compounds mentioned in the samples were homogenized as solvent-based compounds in a kneader with double sigma magnetic hooks. Benzine (hydrocarbon mixture) was used as a solvent. The kneader was water-cooled.

In a first step, the natural rubber was first pre-swollen with a third of the total amount of benzine, the antioxidant, and optionally fillers for 12 hours at 23° C. After this, this so-called pre-batch was kneaded for 15 min. Next, the resin was added and kneaded for 45 min. The plasticizers or liquid resins, as well as a first further amount of benzine, were then added. The amount of benzine was selected so that after this step, the theoretical solid content was 50%. Kneading was carried out for 15 min. The last part of the total amount of benzine was then kneaded into the mixture for 30 min. The final solid content was 30 wt %.

Preparation of the Test Samples

The self-adhesive compound was coated onto a siliconized separating paper using a doctor blade on a commercial laboratory spreading bench (such as from the firm SMO (Sondermaschinen Oschersleben GmbH)). The benzine was evaporated for 10 minutes at 120° C. in an air circulation oven. The gap width on coating was adjusted so that after evaporation of the solvent, an application volume of 55 g/m$^2$ was achieved. The solvent-free film was then covered with a 62 μm thick paper backing and stored until further testing at 23° C. and 50% rel. humidity.

The siliconized separating paper was peeled off for measurement.

|  | Target values | Example Nr. | | | | | |
|---|---|---|---|---|---|---|---|
|  |  | Cmp. ex 1 | Cmp. ex 2 | Cmp. ex 3 | Cmp. ex 4 | Exmp. 1 | Exmp. 2 |
| Natural rubber (SVR 3L) |  | 51.3% | 51.3% | 61.6% | 38.0% | 49.6% | 49.6% |
| Solid resin |  | 47.6% | 0.0% | 24.7% | 34.7% | 29.7% | 39.6% |
| Plasticizer 1 |  | 0.0% | 0.0% | 0.0% | 0.0% | 0.0% | 0.0% |
| Plasticizer 2 |  | 0.0% | 0.0% | 0.0% | 0.0% | 0.0% | 0.0% |
| Plasticizer 3 |  | 0.0% | 47.6% | 12.3% | 26.5% | 19.8% | 9.9% |
| Irganox 1076 |  | 0.8% | 0.8% | 0.9% | 0.6% | 0.7% | 0.7% |
| Methyl-2-mercapto-benzimidazole |  | 0.3% | 0.3% | 0.3% | 0.2% | 0.2% | 0.2% |
| Rubber/SR-PL ratio |  | 1.08 | 1.08 | 1.67 | 0.62 | 1.00 | 1.00 |
| SAFT 0.5 N [° C.] | ≥140 | 156 | 121 | 152 | 127 | 141 | 141 |
| MPM 2 N [μm] | ≤250 [≤200] | 80 | 285 | 140 | 1261 | 224 | 169 |
| ASOP [N/cm] | ≥2 [≥3] | 6.4 | 0.2 | 1.4 | 5.7 | 3.2 | 4.9 |
| Tack [mm] | ≤20 [≤10] | 25 | 23 | 24 | 1 | 2 | 1 |
| Heating cylinder test 140° C. [sec] | >180 | 176 | 150 | >180 | 4 | >180 | >180 |
| Heating cylinder test 160° C. [sec] |  | — | — | 157 | — | 47 | 58 |

|  | Target values | Example Nr. | | | | |
|---|---|---|---|---|---|---|
|  |  | Exmp. 3 | Exmp. 4 | Exmp. 5 | Exmp. 6 | Exmp. 7 |
| Natural rubber (SVR 3L) |  | 49.5% | 53.2% | 51.3% | 51.3% | 48.6% |
| Solid resin |  | 34.7% | 34.5% | 37.3% | 37.3% | 38.8% |
| Plasticizer 1 |  | 0.0% | 11.2% | 0.0% | 0.0% | 0.0% |
| Plasticizer 2 |  | 0.0% | 0.0% | 10.3% | 0.0% | 11.7% |
| Plasticizer 3 |  | 14.9% | 0.0% | 0.0% | 10.3% | 0.0% |
| Irganox 1076 |  | 0.7% | 0.8% | 0.8% | 0.8% | 0.7% |
| Methyl-2-mercapto-benzimidazole |  | 0.2% | 0.3% | 0.3% | 0.3% | 0.2% |
| Rubber/SR-PL ratio |  | 1.00 | 1.16 | 1.08 | 1.08 | 0.96 |
| SAFT 0.5 N [° C.] | ≥140 | 149 | 154 | 153 | 153 | 153 |
| MPM 2 N [μm] | ≤250 [≤200] | 117 | 101 | 94 | 104 | 189 |
| ASOP [N/cm] | ≥2 [≥3] | 3.2 | 3.3 | 3.0 | 4.1 | 4.9 |
| Tack [mm] | ≤20 [≤10] | 4 | 7 | 5 | 2 | 3 |
| Heating cylinder test 140° C. [sec] | >180 | >180 | >180 | >180 | >180 | >180 |
| Heating cylinder test 160° C. [sec] |  | 44 | 96 | 112 | 103 | 38 |

Raw Materials Used:
Natural rubber (SVR 3L)—Natural rubber
Solid resin: Poly-alpha-terpene resin, R&B=115° C.
Plasticizer 1: Naphthenic white oil, pour point according to DIN ISO 3016: −30° C., softening point $T_E$<30° C.; carbon distribution naphthenic/paraffinic 42/58)
Plasticizer 2: Polybutene (Mn=910 g/mol); softening point $T_E$<30° C.
Plasticizer 3: Liquid resin-piperylene-based liquid hydrocarbon resin, R&B=10° C.; softening point <<30° C. (liquid)
Antioxidant: Irganox 1076—antioxidant
Antioxidant: Methyl-2-mercaptobenzimidazole Further Explanations:
Target
values: It has been found that adhesive tapes for the intended purpose of use, i.e. use in the splicing of flat webs with nonpolar surfaces, are particularly suitable if the target values specified in the table are met. Particularly outstanding properties in the field of application are seen for adhesive tapes that meet the preferred values (shown in the table in brackets).
Cmp.ex=comparison example
Rubber/SR-PL ratio=ratio of the amount of rubber to the total amount of solid resins and plasticizers
SAFT=Shear adhesion failure temperature test
MPM=Microshear path measurement
ASOP=Adhesive strength on polyethylene
Tack=Rolling ball tack The preceding examples (table) show the suitability of the self-adhesive compounds according to the invention for flying splices. All of the examples (examples 1 to 8) are suitable for use as self-adhesive compounds in an adhesive tape for flying splices. In particular, they meet the requirements for sufficiently high shear strength (microshear path), particularly under temperature stress (SAFT test, heating cylinder test). Even at 160° C., all of the examples according to the invention still showed satisfactory shear strength, with satisfactory values of over 40 sec in all cases. Particularly preferred according to the invention are adhesive compounds that also show favourable values at this temperature, as they can be outstandingly used even at high temperatures; these are in particular examples 4, 5 and 6 according to the invention, with values for over 90 s in the heating cylinder test at 160° N again being clearly higher than in the other examples according to the invention.

Although comparison examples 1-4 meet individual criteria, they all show drawbacks as well.

The invention claimed is:

1. Method comprising bonding of flat web materials in a flying splicing process with an adhesive tape, wherein the adhesive tape comprises:
(I) an upper self-adhesive compound layer comprising natural rubber compound comprising the following components:
(a) 40 to 60 wt % of natural rubber;
(b) 10 to 50 wt % of one or a plurality of solid resins selected from the group consisting of terpene phenol resins, colophony resins, and mixtures thereof;
(c) 8 to 20 wt % of a plasticizer; and
(d) optionally up to 10 wt % of additional components;
wherein the weight of component (a) in the natural rubber compound divided by the combined weight of components (b) and (c) in the natural rubber compound is a value of 0.75 to 1.60;
(II) an inner adhesive tape area adapted as a flat predetermined breaking point; and
(III) a lower self-adhesive compound on an underside of the inner adhesive tape area.

2. Method according to claim 1, wherein the content of the solid resins—component (b)—in the self-adhesive compound is 20 to 50 wt %.

3. Method according to claim 1, wherein the content of the plasticizers—component (c)—in the self-adhesive compound is 8 to 2-015 wt %.

4. Method according claim 1, wherein the content of the additional components—component (d)—in the self-adhesive compound is up to 3 wt %.

5. Method according to claim 1, wherein the self-adhesive compound is composed exclusively of components (a) to (d).

6. Method according to claim 1, wherein softening temperatures of the solid resins used—component (b)—and the plasticizers used—component (c)—differ by at least 20° C.

7. Method according to claim 1, wherein a natural rubber adhesive compound is also used for the lower self-adhesive compound layer.

8. Method according to claim 7, wherein the natural rubber adhesive compound of the lower self-adhesive compound layer is an adhesive compound comprising the following components:
a) 40 to 60 wt % of natural rubber
b) 10 to 50 wt % of one or a plurality of solid resins
c) 8 to 40 wt % of a plasticizer, and
d) optionally up to 10 wt % of additional components.

9. Method according to claim 7, wherein the lower self-adhesive compound is identical in composition to the upper self-adhesive compound.

10. Method according to claim 1, wherein the flat predetermined breaking point is achieved in that the inner adhesive tape area is formed by or comprises:
a paper layer that is splittable over its entire surface or parts of its surface, or layers laminated together that are detachable over their entire surface or parts of their surface.

11. Method according to claim 1, wherein the natural rubber compound of the upper self-adhesive compound layer comprises at least 48.6 wt. % natural rubber.

12. Method according to claim 1, wherein the natural rubber compound of the upper self-adhesive compound layer does not comprise any aliphatic, aromatic, or aliphatic-aromatic hydrocarbon resins.

13. Method for flying splices of flat web material wound onto rolls,
said method comprising first preparing an upper coil-forming flat web section of a roll of a new flat web with adhesive tape comprising an upper self-adhesive compound layer, an inner adhesive tape area adapted as a flat predetermined breaking point, and a lower self-adhesive compound on the underside of the inner adhesive tape area, attaching the underlying coil-forming flat web section to the adhesive tape, specifically in such a way that a surface area of the front side first adhesive compound layer is exposed, after which placing the new roll thus equipped next to an almost fully depleted old roll to be replaced and accelerating to essentially the same circumferential speed as said old roll, and pressing the new roll against the old web unwinding from the old roll, wherein the exposed surface area of the front side adhesive compound layer of the adhesive tape is bonded to the old web at essentially the same web speeds, and wherein, simultaneously with or immediately after bonding, flat splitting or layer separation takes place at least in the predetermined breaking areas of the adhesive tape, so that the respective material residues remaining on the adhesive tape remnants cover the adhesive tape layers, with the result that no adhesive areas remain exposed after the splitting or separation, wherein the adhesive tape is a tape comprising:
(I) an upper self-adhesive compound layer comprising natural rubber compound comprising the following components:
   (a) 40 to 60 wt % of natural rubber;
   (b) 10 to 50 wt % of one or a plurality of solid resins selected from the group consisting of terpene phenol resins, colophony resins, and mixtures thereof;
   (c) 8 to 20 wt % of a plasticizer; and
   (d) optionally up to 10 wt % of additional components;
   wherein the weight of component (a) in the natural rubber compound divided by the combined weight of components (b) and (c) in the natural rubber compound is a value of 0.75 to 1.60;
(II) an inner adhesive tape area adapted as a flat predetermined breaking point; and
(III) a lower self-adhesive compound on an underside of the inner adhesive tape area.

14. Method according to claim 13, wherein the natural rubber compound of the upper self-adhesive compound layer does not comprise any aliphatic, aromatic, or aliphatic-aromatic hydrocarbon resins.

* * * * *